United States Patent [19]

Igarashi et al.

[11] Patent Number: 4,641,742
[45] Date of Patent: Feb. 10, 1987

[54] ARTICLE TRANSFER APPARATUS

[75] Inventors: Makoto Igarashi, Tokyo; Kiichiro Okano, Chiba; Naoki Kumagami, Sagamihara, all of Japan

[73] Assignee: Toppan Printing Co., Ltd., Tokyo, Japan

[21] Appl. No.: 599,927

[22] Filed: Apr. 13, 1984

[30] Foreign Application Priority Data

Apr. 13, 1983 [JP] Japan .................................. 58-65029

[51] Int. Cl.$^4$ ............................................ B65G 15/20
[52] U.S. Cl. ................................................... 198/627
[58] Field of Search ............... 198/627, 653, 810, 502, 198/803.1, 627, 810, 502.3

[56] References Cited

U.S. PATENT DOCUMENTS

| | | | |
|---|---|---|---|
| 3,325,977 | 6/1967 | Kirsten | 53/250 |
| 3,779,364 | 12/1973 | Kammann | 198/803.1 |
| 4,233,499 | 11/1980 | Formby | 198/502 |
| 4,398,629 | 8/1983 | Williamson | 198/627 |
| 4,508,210 | 4/1985 | Ramcke et al. | 198/627 |

FOREIGN PATENT DOCUMENTS

| | | | |
|---|---|---|---|
| 0131280 | 10/1979 | Japan | 198/627 |
| 2092982 | 8/1982 | United Kingdom | 198/627 |
| 0839915 | 6/1981 | U.S.S.R. | 198/810 |

Primary Examiner—Joseph E. Valenza
Assistant Examiner—D. Glenn Dayoan
Attorney, Agent, or Firm—Bacon & Thomas

[57] ABSTRACT

Disclosed is an article transfer apparatus which comprises four driving sprockets, four free sprockets, and endless chains each having hooks arranged at regular intervals, and which carries an article held between front-end hooks and rear-end hooks. Driving sprockets for the rear-end hooks are rotated by a main motor, and driving sprockets for the front-end hooks are connected to the driving sprockets for the rear-end hooks by means of clutches. The distance between the hooks holding the article can be changed by disengaging the clutches and rotating free sprockets for the front-end hooks by means of a servomotor.

8 Claims, 6 Drawing Figures

ARTICLE TRANSFER APPARATUS

BACKGROUND OF THE INVENTION

The present invention relates to an article transfer apparatus used in cartoning machines, etc., which is adapted to carry articles by holding them on both their front- and rear-end sides by means of hooks.

Figure 1:
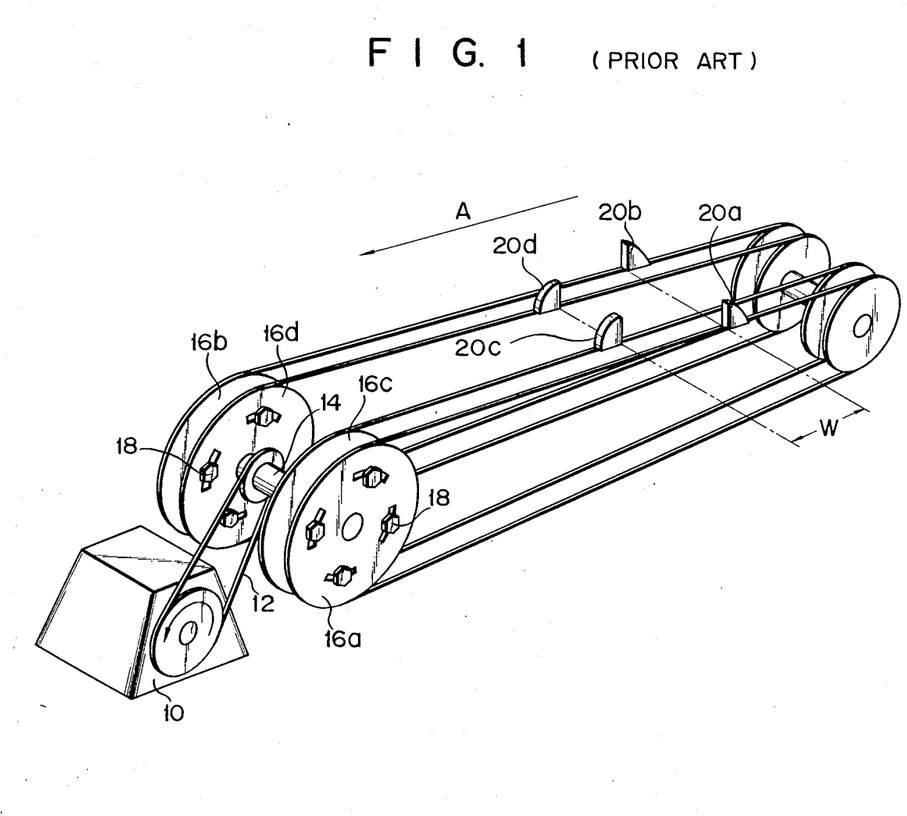
FIG. 1 is a perspective view of a prior art article transfer apparatus.

Recently, in the field of encasing work as in a confectionery, etc., cartoning machines have been used which fold unerected cartons as they carry them, and which tuck in and paste up the margin flaps of the cartons after they are loaded. FIG. 1 is a perspective view of an article transfer apparatus used in one such cartoning machine. This apparatus uses four hooks in the front and in the rear to prevent the article from being dislocated during various intermediate operations, such as tucking, etc. The driving force of a motor 10 rotating in the counterclockwise direction is transmitted to a driving shaft 14 of a conveyor means by means of a chain 12. Driving sprockets 16a and 16b are fixedly mounted on the driving shaft 14, while driving sprockets 16c and 16d are rotatably fitted on the shaft 14. The driving sprockets 16c and 16d are joined to the driving sprockets 16a and 16b, respectively, by means of bolts 18. The driving sprockets 16a, 16b, 16c and 16d rotate the endless chains in a counterclockwise direction along with the rear-end hooks 20a and 20b, and the front-end hooks 20c and 20d, respectively, and carry an article between the hooks 20c, 20d and 20a, 20b in the direction of arrow A. Although only one set of hooks 20a to 20d is shown in FIG. 1, a plurality of sets of hooks are actually provided so that a plurality of articles are on the path of transfer at a time.

In the prior art article transfer apparatus, if the articles to be transferred are varied in size, then the distance W between the front- and rear-end hooks must be changed. In doing this, the position of the front-end hooks 20c and 20d needs to be shifted by rotating the driving sprockets 16c and 16d relative to the driving sprockets 16a and 16b after removing the bolts 18. As this adjustment work is manual, it takes a lot of time and is not very accurate. Even though the front-end hooks can be shifted with high accuracy, tightening the bolts will sometimes lower the positioning accuracy.

SUMMARY OF THE INVENTION

The object of the present invention is to provide an article transfer apparatus for carrying articles by holding them on both their front- and rear-end sides in which the width of the means for holding the articles can be accurately and quickly changed to cope with any variations in the size of the articles.

The above objects may be attained by an article transfer apparatus which comprises first and second conveyors whose driving shafts are connected by means of clutches, the first and second conveyors having a first hook for supporting the front end of an article and a second hook for supporting the rear end of the article, respectively, a drive source connected to the driving shaft of the first or second conveyor for driving together the first and second conveyors to transfer the article held between the first and second hooks, and an adjusting unit disconnecting the driving shafts of the first and second conveyors by means of the clutches, and driving at least one of the two conveyors, thereby changing the distance between the first and second hooks.

DETAILED DESCRIPTION OF THE PREFERRED EMBODIMENT

Figure 2:
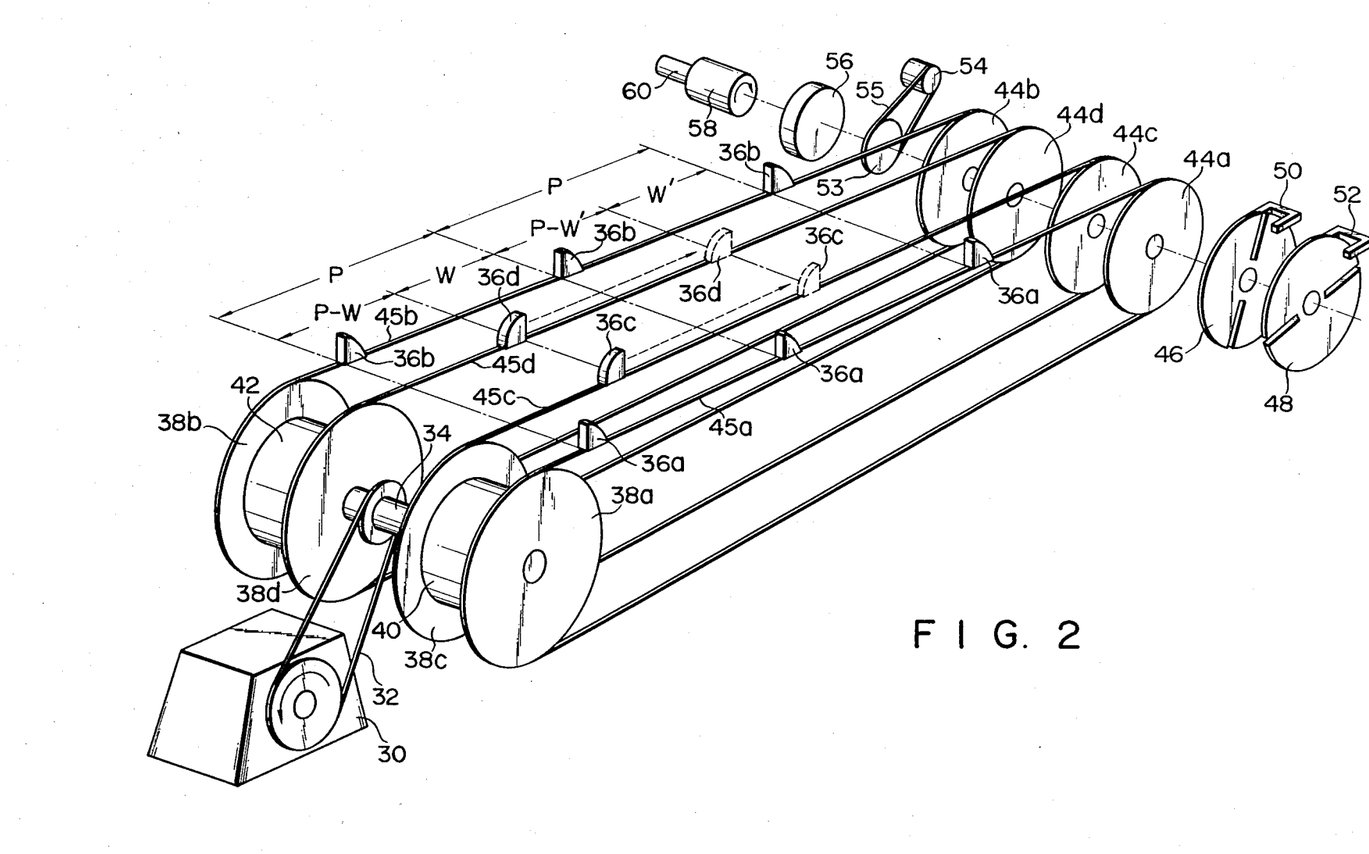
FIG. 2 is a perspective view of an article transfer apparatus according to one embodiment of the present invention.

One embodiment of an article transfer apparatus according to the present invention will now be described in detail with reference to the accompanying drawings. FIG. 2 is a perspective view of the apparatus. The driving force of a main motor 30 rotating in the counterclockwise direction is transmitted to a driving shaft 34 by means of a chain 32. Driving sprockets 38a and 38b are fixedly mounted on the driving shaft 34. Between the driving sprockets 38a and 38b, driving sprockets 38c and 38d are rotatably mounted on the driving shaft 34. The driving sprockets 38c and 38d are connected to the driving sprockets 38a and 38b by means of electromagnetic clutches 40 and 42 so as to rotate together with the driving shaft 34. Paired with the driving sprockets 38a, 38b, 38c and 38d, respectively, are free sprockets 44a, 44b, 44c and 44d which are arranged along the axis. Endless chains 45a, 45b, 45c and 45d having rear-end hooks 36a and 36b, and front-end hooks 36c and 36d, respectively, are stretched between the driving sprockets 38a, 38b, 38c and 38d, and the free sprockets 44a, 44b, 44c and 44d, respectively. Each of articles is carried while being held between a set of hooks or stops, i.e., by each two aligned front-end hooks or stops 36c, 36d and each two aligned rear-end hooks or stops 36a, 36b. Although each chain has a number of hook or stops sets arranged at regular intervals, only some of them are shown in FIG. 2 for simplicity.

Figure 3:
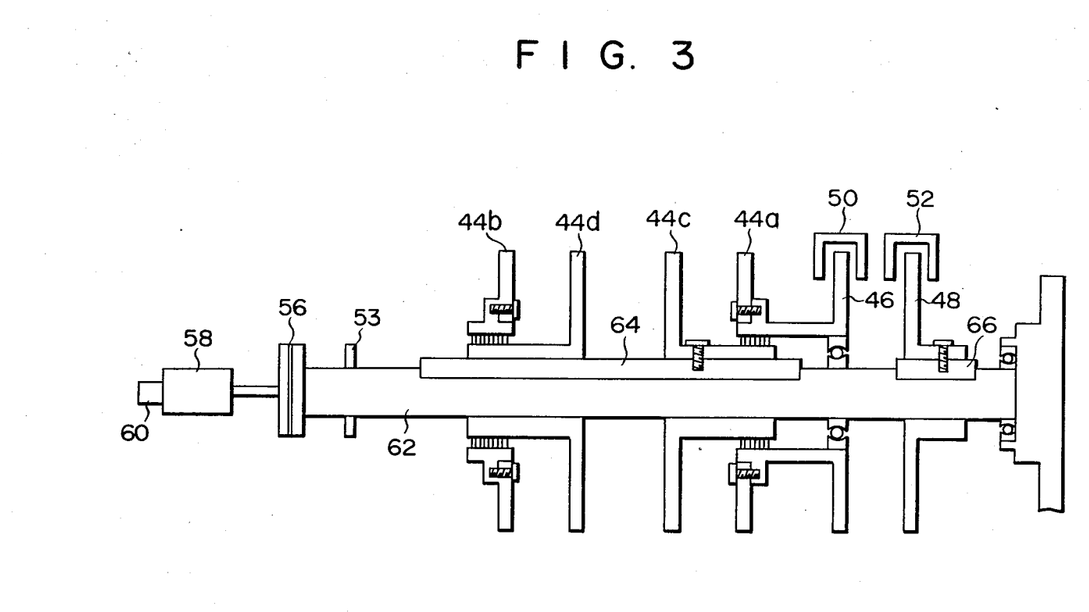
FIG. 3 is a sectional view showing the details of the free-sprocket-side configuration of the apparatus of FIG. 2.

FIG. 3 is a sectional view showing the construction of the apparatus on the side of the axis of the free sprockets 44a to 44d. As seen from FIG. 3, the free sprockets 44c and 44d for the front-end hooks 36c, 36d are fixed to a follower shaft 62 by means of a key 64. On the other hand, the free sprockets 44a and 44b for the rear-end hooks 36a, 36b are allowed to rotate around the follower shaft 62. The follower shaft 62 is also provided with a disk 46 which rotates around the shaft 62 in association with the free sprocket 44a and a disk 48 which is fixed to the shaft 62 by means of a key 66 so as to rotate together with the free sprockets 44c and 44d. Each of the disks 46 and 48 has two slits or orifices on a diameter so that photo-couplers 50 and 52 are switched on with every half-revolution of their corresponding disks 46 and 48. The photo-couplers 50 and 52 are switched on with the same period. This period is equal to the time it takes for each hook to move a half-pitch (one pitch is indicated by P in FIG. 2) during the rotation of the main motor 30. The rotation of the follower shaft 62 is transmitted by means of a sprocket 53 and a chain 55 to a rotary encoder 54, whereby the amount of rotation of the follower shaft 62 is detected. The follower shaft 62 is connected to the driving shaft of a servomotor 58 by means of an electromagnetic clutch 56. The driving shaft of the servomotor 58 is also connected with a rotary encoder 60. In contrast with the main motor 30, it is assumed that the servomotor 58 rotates in the clockwise direction.

Figure 4:
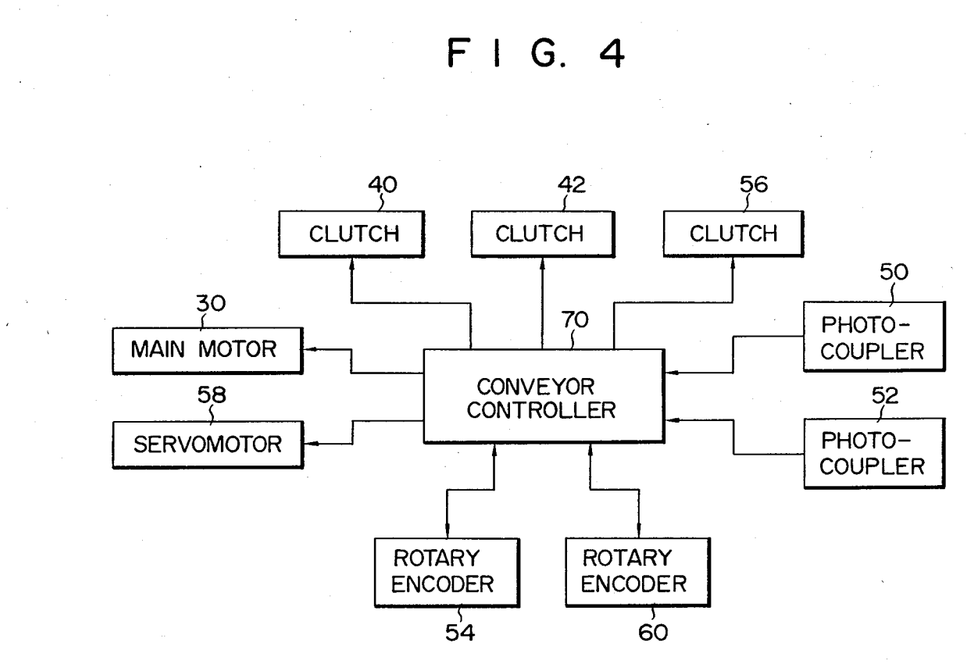
FIG. 4 is a block diagram of a control circuit used in the apparatus of FIG. 2.

FIG. 4 is a block diagram of a control circuit for the whole apparatus according to this embodiment. The principal control is performed by a conveyor controller 70. The outputs of the photo-couplers 50 and 52 and the rotary encoders 54 and 60 are supplied to the conveyor controller 70, from which control signals are supplied to the main motor 30, the clutches 40, 42 and 56, the rotary encoders 54 and 60, and the servomotor 58.

The operation of the apparatus of this embodiment will now be described. Normally, the clutches 40 and 42 are engaged while the clutch 56 is disengaged. Thus, when the main motor 30 rotates counterclockwise, the front-end hooks 36c and 36d and the rear-end hooks 36a and 36b move from the free sprocket to the driving sprocket, maintaining a predetermined distance W between them. As a result, the articles are transferred from the free sprocket to the driving sprocket while being held between the hooks 36.

Figure 5A:
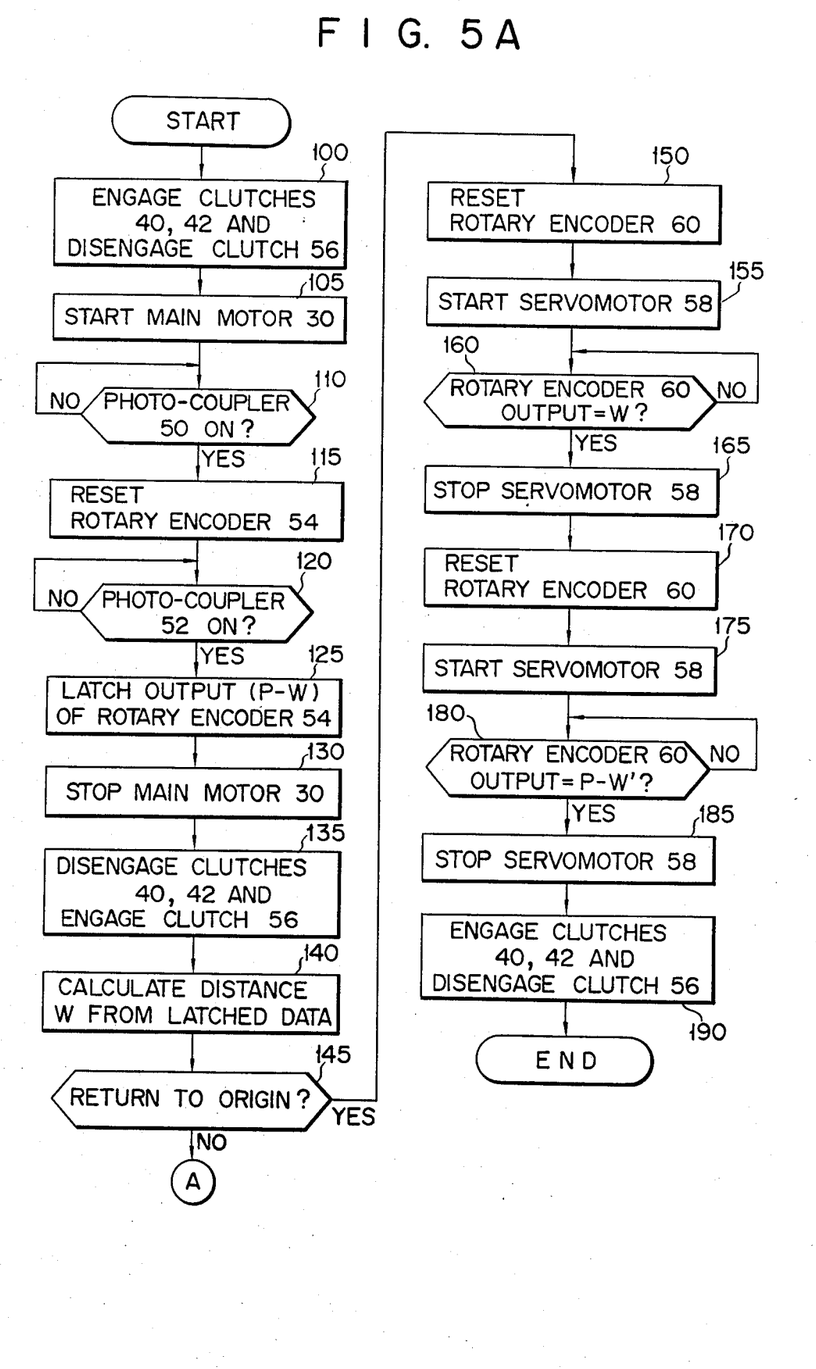
FIGS. 5A and 5B are flow charts illustrating an operation for changing the distance between the front- and rear-end hooks.

Referring now to the flow charts of FIGS. 5A and 5B, the operation for changing the distance W between the hooks to permit the transfer of articles varied in size will be described. First, in step 100, the clutches 40 and 42 are engaged and the clutch 56 is disengaged. The main motor 30 is then started in step 105 (as in the conventional transfer apparatus). Subsequently, it is determined whether the photo-coupler 50 is on in step 110. If the photo-coupler 50 is on, the rotary encoder 54 is reset in step 115. Then, it is determined whether the photo-coupler 52 is on in step 120. If the photo-coupler 52 is on, the output of the rotary encoder 54 is latched in step 125. At this time, the rotary encoder 54 detects the difference between the phase angles of the positions of the slits of the two disks 46 and 48. Since the two disks 46 and 48 are interlocked with the free sprockets 44a and 44c, respectively, the phase angle difference is equivalent to the distance P-W (see FIG. 2) between the rear-end hooks 36a and 36b, and the directly following front-end hooks 36c and 36d. When the data P-W is latched, the main motor 30 is stopped in step 130. The clutches 40 and 42 are disengaged and the clutch 56 is engaged in step 135. In step 140, the distance W between the hooks is calculated from the given pitch P and the latched data P-W.

In this embodiment, the hook distance W is changed by shifting the front-end hooks 36c and 36d to the free sprocket. It is assumed that the reference point (origin) of the coordinates for measuring the shift amount is placed on the position of each rear-end hook of each set. The hook distance may be adjusted in two alternative ways. In one of these ways, the distance is fixed after the front-end hooks are restored to their origin. In the other, an adjustment can be made directly without identifying the origin. Although the former way is more time-consuming as the origin must be identified each time, it is higher in accuracy than the latter. Also, the former does not require any data on the current hook distance. In step 145, it is determined which way to choose. If the former way (restoring to the origin) is designated, the rotary encoder 60 is reset in step 150, and the servomotor 58 is then started clockwise in step 155. The clockwise rotation of the servomotor 58 is transmitted to the follower shaft 62 by means of the clutch 56, so that the free sprockets 44c and 44d rotate together with the follower shaft 62. As a result, the front-end hooks 36c and 36d move from the driving sprocket to the free sprocket, thereby shortening the hook distance. In step 160, it is determined whether the output of the rotary encoder 60 is coincident with the hook distance data W. If a coincidence is detected, the servomotor 58 is stopped in step 165. At this time, the front-end hooks 36c and 36d are aligned with the rear-end hooks 36a and 36b. Then, the rotary encoder 60 is reset again in step 170, and the servomotor 58 is started in step 175. The hook distance may be adjusted to W' by only moving the front-end hooks 38c and 38d to the free sprocket by a distance P-W'. In step 180, it is determined whether the output of the rotary encoder 60 is coincident with the distance P-W'. If a coincidence is detected, the servomotor 58 is stopped in step 185, and thus the hook distance is changed from W to W'. The clutches 40, 42 are engaged and the clutch 56 is disengaged in step 190.

Figure 5B:
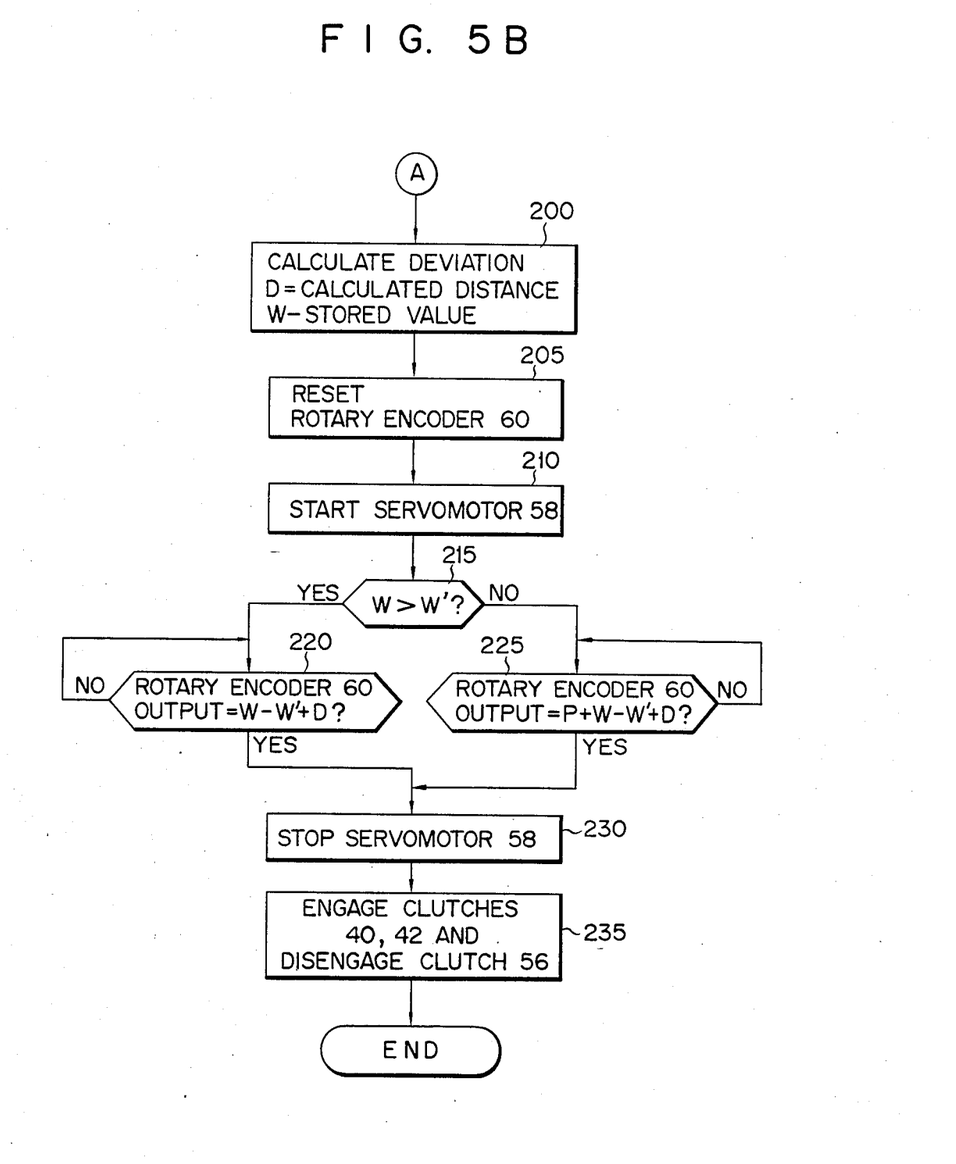

On the other hand, if it is detected that the distance of the hooks is changed without restoring the front-end hooks to the origin, in step 145, then step 200 of FIG. 5B is executed. Here if data of the current hook distance and the distance obtained after the change is given, the displacement of the front-end hooks may be obtained with ease. However, if the shift is repeated several times on the data basis, errors will accumulate. Accordingly, the deviation D of the current data of the hook distance from the calculated value W based on actual measurement is first calculated in step 200. The deviation D equals the calculated value W minus the current hook distance data. The rotary encoder 60 is reset in step 205, and the servomotor 58 is started in step 210. If the current distance (calculated value W) is shorter than the distance W' obtained after the change, the front-end hooks 36c and 36d must be moved to the free sprocket beyond the origin (rear-end hooks). If the distance W is greater than the distance W', the front-end hooks 36c and 36d need not be moved beyond the origin. Accordingly, it is determined whether W is greater than W' in step 215. If W>W' is detected, W−W'+D is obtained as the displacement of the front-end hooks, i.e., the amount of rotation of the servomotor 58, as shown in step 220. If W<W' is detected, then P+W−W'+D is given as the amount of rotation of the servomotor 58, as shown in step 225. When the amount of rotation of the servomotor 58 reaches this predetermined value, the servomotor 58 is stopped in step 230. The clutches 40, 42 are engaged and the clutch 56 is disengaged in step 235.

According to the article transfer apparatus of the present invention, as described above, the driving sprockets for the front-end hooks and those for the rear-end hooks are connected by means of the clutches, so that the distance between the hooks may be changed by only disengaging the clutches and rotating one set of the driving sprockets for a predetermined amount. Thus, the hook distance may accurately be adjusted in a short time. Also, the apparatus of the invention is highly safe, since it need not be touched directly by hand during its operation. Aslo, if the article transfer apparatus is applied to a cartoning machine, a plurality of packing lines can be connected to the single cartoning machine, thereby reducing the floor space required and improving the operating efficiency of the machine.

It is to be understood that the present invention is not limited to the embodiment described above, and that various changes and modifications may be effected therein by one skilled in the art without departing from the scope or spirit of the invention. It is not essential to provide two rotary encoders. The rotary encoder 60 is connected to the driving shaft of the servomotor 58 since it is impossible to read the output of the rotary encoder 54 during the rotation of the servomotor 58. Furthermore, the displacement of the front-end hooks may more easily be calculated by allowing the servomotor 58 to rotate in either direction instead of only rotating in one direction. It is necessary to use such a servomotor when hooks can't be crossed, e.g., in case of bucket conveyor.

What is claimed is:

1. An article transfer apparatus comprising:
   (a) first and second conveyor means having driving shafts, each conveyor means having at least a driving sprocket, a free sprocket, an endless chain extending partially around and between the driving sprocket and the free sprocket, and a plurality of stops arranged at regular intervals on the endless chain for engaging articles, the stops on one chain being used for engaging the front ends, and the stops on the other chain being used to engage the rear ends, of the articles;
   (b) first clutch means connecting the driving sprockets of the first and second conveyor means such that the conveyors are drivingly interconnected when the clutch is engaged and relative movement between the conveyor means is permitted when the clutch is disengaged;
   (c) a main motor drive means drivingly connected to the drive sprocket of the first conveyor means;
   (d) a servomotor;
   (e) second clutch means connecting the servomotor to the free sprocket wheel of the second conveyor means; and
   (f) adjusting means to disengage the first clutch means, engage the second clutch means and actuate the servomotor to move the second conveyor means relative to the first conveyor means thereby adjusting the distance between the stops on the first and second conveyor means;
   (g) said adjusting means including: photo-couplers adapted to deliver one pulse with every half-revolution of the free sprockets of the first and second conveyor means; and, a rotary encoder for detecting the amount of rotation of the free sprockets which measures the distance between the front and rear engaging stops in accordance with the output of the rotary encoder during the time interval between the deliveries of the outputs of the photo-couplers.

2. An article transfer apparatus according to claim 1, wherein said adjusting means includes means for changing the distance between the stops only after restoring the first stop to the position of the second stop.

3. An article transfer apparatus according to claim 1, wherein the rotating direction of said driving sprockets driven by the main motor is opposite to that of said free sprockets driven by the servomotor.

4. An article transfer apparatus comprising:
   (a) first and second conveyor means having driving shafts, each conveyor means having at least a driving sprocket, a free sprocket, an endless chain extending partially around and between the driving and free sprockets, and a plurality of stops arranged at regular intervals on the endless chain for engaging articles, the stops on one chain being used for engaging the front ends, and the stops on the other chain being used to engage the rear ends, of articles;
   (b) position sensor means for sensing the relative positions of the driving and free sprockets, said position sensing means being arranged to provide output position signals indicative of the relative rotary position of the driving and free sprockets;
   (c) first clutch means connecting the driving sprockets of the first and second conveyor means such that the first and second conveyor means are drivingly interconnected when the first clutch means is engaged and relative movement between the first and second conveyor means is permitted when the first clutch means is disengaged;
   (d) a main motor drive means drivingly connected to the drive sprocket of the first conveyor means;
   (e) a servomotor;
   (f) second clutch means connecting the servomotor to the free sprocket of the second conveyor means; and
   (g) adjusting means for engaging the first clutch means, disengaging the second clutch means, and actuating the main motor drive means to advance the first and second conveyor means; and means for disengaging the first clutch means, engaging the second clutch means, actuating the servomotor, and detecting said position signals and controlling the servomotor in response to said position signals to move the second conveyor means relative to the first conveyor means over a selected distance and thereby adjusting the distance between the stops on the first and second conveyor means.

5. The article transfer apparatus according to claim 5, wherein said position sensor means comprise aperture disks respectively connected to rotate with said driving and free sprockets, and photo-detectors associated with said disks for sensing their phase relationship.

6. An article transfer apparatus comprising:
   (a) first and second conveyor means having driving shafts, the first conveyor means having at least a first stop for engaging a front end of an article and the second conveyor means having at least a second stop for engaging a rear end of the article;
   (b) first clutch means interconnecting the driving shafts of the first and second conveyor means when the first clutch is engaged and permitting relative movement between the first and second conveyor means when the clutch is disengaged;
   (c) a first, main motor means drivingly connected through the first clutch means to the driving shafts of the first and second conveyor means to drive both the conveyor means to transfer an article held between the first and second stops;
   (d) a second servomotor means connected to one of the two conveyor means through a second clutch means normally disengaged when the first clutch means is engaged;
   (e) distance adjusting means arranged to disengage the first clutch means, engage the second clutch means and actuate the servomotor means to move one conveyor relative to the other, thereby changing the distance between said first and second stops;

(f) electrical position sensor means arranged to sense the relative positions of the first and second stops relative to each other and to generate electrical distance signals indicative of the distance between said stops;

(g) electrical means for receiving said distance signals and for actuating the servomotor in response to said distance signals, whereby operation of the servomotor is regulated to selectively adjust the distance between said first and second stops.

7. An article transfer apparatus according to claim 7, said electrical position sensor means comprising photocouplers for detecting the relative positions of the driving shafts of the first and second conveyor means.

8. An article transfer apparatus according to claim 8, wherein said servomotor means is rotatable in a direction opposite to that of the main motor means.

* * * * *